(12) United States Patent
Kim et al.

(10) Patent No.: US 7,752,435 B2
(45) Date of Patent: Jul. 6, 2010

(54) METHOD FOR MANAGING USER KEY FOR BROADCAST ENCRYPTION

(75) Inventors: Dae-youb Kim, Seoul (KR); Hwan-joon Kim, Seoul (KR); Weon-il Jin, Suwon-si (KR); Sung-joon Park, Seoul (KR); Dong-hoon Lee, Goyang-si (KR); Jung-yeon Hwang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1269 days.

(21) Appl. No.: 11/271,990

(22) Filed: Nov. 14, 2005

(65) Prior Publication Data

US 2006/0107043 A1    May 18, 2006

(30) Foreign Application Priority Data

Nov. 12, 2004    (KR)    ............... 10-2004-0092550

(51) Int. Cl.
*H04L 29/06*    (2006.01)

(52) U.S. Cl. ...................................... 713/163
(58) Field of Classification Search ............... None
See application file for complete search history.

(56) References Cited

U.S. PATENT DOCUMENTS

| 6,397,329 B1 * | 5/2002 | Aiello et al. ............. 713/155 |
| 2004/0249972 A1 * | 12/2004 | White et al. ............. 709/243 |

* cited by examiner

*Primary Examiner*—Brandon S Hoffman
(74) *Attorney, Agent, or Firm*—Sughrue Mion, PLLC (57) ABSTRACT

A method of managing a user key for a broadcast encryption. The method includes assigning numbers to respective users and arranging the users on a ring-shaped structure in order to map hash chains onto the respective nodes of a ring-shaped structure. The method further includes making random node keys correspond to the respective nodes, one by one, constructing the hash chains from the corresponding node keys using a hash function, and successively mapping the constructed hash chains onto the nodes of the ring-shaped structure.

11 Claims, 12 Drawing Sheets

| FIRST NODE | SECOND NODE | THIRD NODE | FOURTH NODE | ... | (N−1)-TH NODE | N-TH NODE |
|---|---|---|---|---|---|---|
| $k_1$ | $h(k_1)$ | $h^2(k_1)$ | $h^3(k_1)$ | ... | $h^{N-2}(k_1)$ | $h^{N-1}(k_1)$ |
| $h^{N-1}(k_2)$ | $k_2$ | $h(k_2)$ | $h^2(k_2)$ | ... | $h^{N-3}(k_2)$ | $h^{N-2}(k_2)$ |
| $h^{N-2}(k_3)$ | $h^{N-1}(k_3)$ | $k_3$ | $h(k_3)$ | ... | $h^{N-4}(k_3)$ | $h^{N-3}(k_3)$ |
| $h^{N-3}(k_4)$ | $h^{N-2}(k_4)$ | $h^{N-1}(k_4)$ | $k_4$ | ... | $h^{N-5}(k_4)$ | $h^{N-4}(k_4)$ |
| ... | ... | ... | ... | ... | ... | ... |
| $h^2(k_{N-1})$ | $h^3(k_{N-1})$ | $h^4(k_{N-1})$ | $h^5(k_{N-1})$ | ... | $k_{N-1}$ | $h(k_{N-1})$ |
| $h(k_N)$ | $h^2(k_N)$ | $h^3(k_N)$ | $h^4(k_N)$ | ... | $h^{N-1}(k_N)$ | $k_N$ |

| FIRST NODE | SECOND NODE | THIRD NODE | FOURTH NODE | ... | (N-1)-TH NODE | N-TH NODE |
|---|---|---|---|---|---|---|
| $k_1$ | $h(k_1)$ | $h^2(k_1)$ | $h^3(k_1)$ | ... | $h^{N-2}(k_1)$ | $h^{N-1}(k_1)$ |
| $h^{N-1}(k_2)$ | $k_2$ | $h(k_2)$ | $h^2(k_2)$ | ... | $h^{N-3}(k_2)$ | $h^{N-2}(k_2)$ |
| $h^{N-2}(k_3)$ | $h^{N-1}(k_3)$ | $k_3$ | $h(k_3)$ | ... | $h^{N-4}(k_3)$ | $h^{N-3}(k_3)$ |
| $h^{N-3}(k_4)$ | $h^{N-2}(k_4)$ | $h^{N-1}(k_4)$ | $k_4$ | ... | $h^{N-5}(k_4)$ | $h^{N-4}(k_4)$ |
| ... | ... | ... | ... | ... | ... | ... |
| $h^2(k_{N-1})$ | $h^3(k_{N-1})$ | $h^4(k_{N-1})$ | $h^5(k_{N-1})$ | ... | $k_{N-1}$ | $h(k_{N-1})$ |
| $h(k_N)$ | $h^2(k_N)$ | $h^3(k_N)$ | $h^4(k_N)$ | ... | $h^{N-1}(k_N)$ | $k_N$ |

METHOD FOR MANAGING USER KEY FOR BROADCAST ENCRYPTION

CROSS-REFERENCE TO RELATED APPLICATIONS

This application claims priority from Korean Patent Application No. 2004-92550, filed on Nov. 12, 2004, the entire content of which is incorporated herein by reference.

BACKGROUND OF THE INVENTION

1. Field of the Invention

The present invention relates to a broadcast encryption method. More particularly, the present invention relates to a method of managing a user key for a broadcast encryption.

2. Description of Related Art

A broadcast encryption (BE) refers to a method for effectively transferring information to the requesting users among all users by a transmitter (i.e., a broadcast center), and should effectively be used in cases where the users, who will receive the information, are voluntarily and dynamically changed. One of the most important properties of the BE is the revocation or expiration of unwanted users (for example, revoked users or users whose use term has expired).

Figure 1:
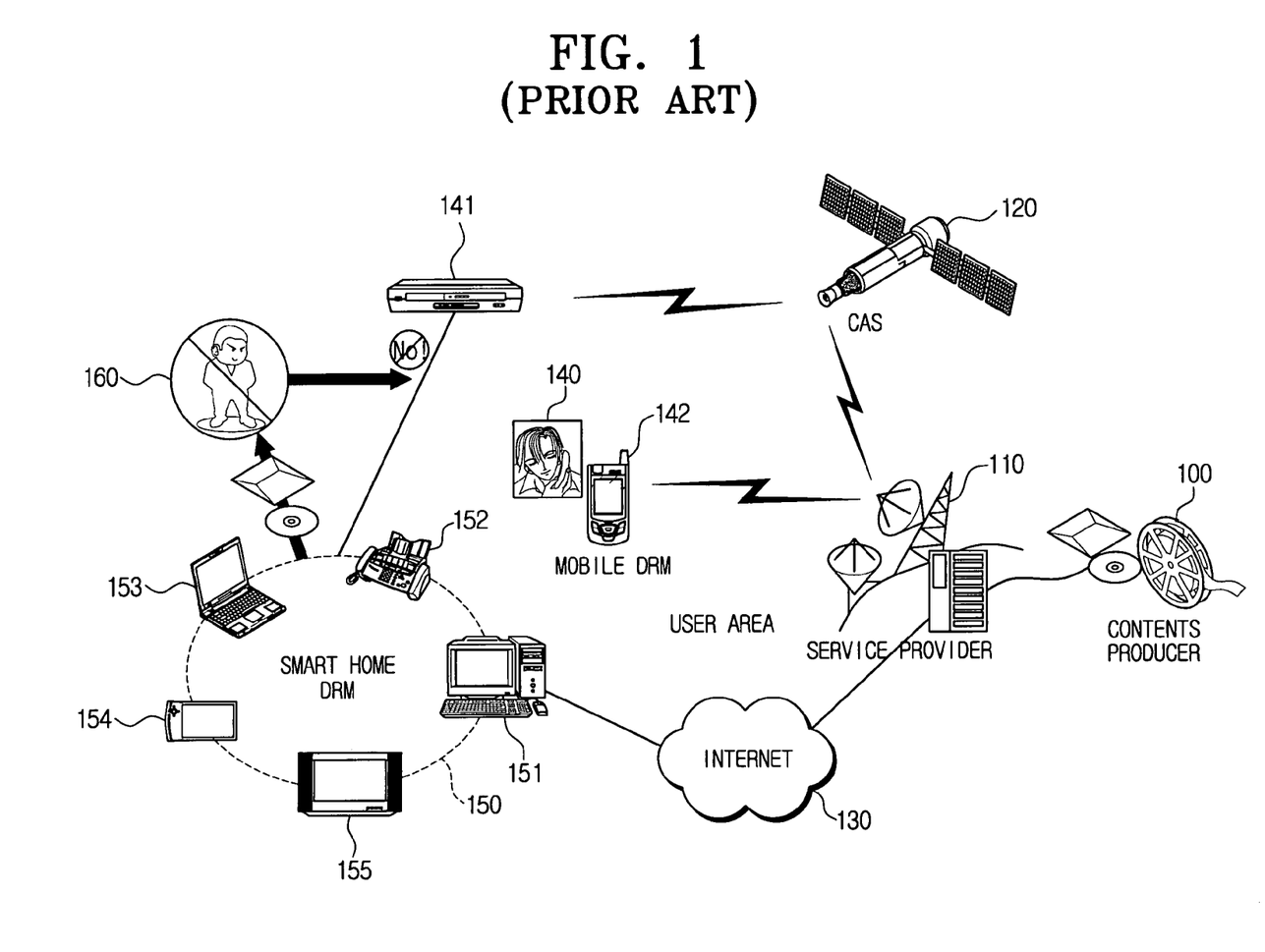
FIG. 1 is a view illustrating the network structure of a data transmission system according to a conventional broadcast encryption.

FIG. 1 is a view illustrating the network structure of a data transmission system according to a general broadcast encryption. Referring to FIG. 1, a contents producer 100 produces various kinds of useful data including audio/video data, and provides the produced data to a service provider 110. The service provider 110 broadcasts the data provided from the contents producer 100 to authorized users (for example, a digital right management (DRM) network 140 and a smart home DRM network 150) who have paid for the corresponding data through various kinds of wire/wireless communication networks.

Specifically, the service provider 110 may transmit the data to user devices such as a set-top box 141, which is provided with various kinds of satellite receivers, through a satellite 120, or may transmit the data to a mobile communication terminal 142 through a mobile communication network (Mobile DRM). Additionally, the service provider 110 may transmit the data to various kinds of terminals 151, 152, 153, 154 and 155 of the smart home network DRM 150 through Internet 130.

Meanwhile, in order to prevent a revoked user 160 from using the data for which he or she has not paid, the data is encrypted by the broadcast encryption (BE).

The security in an encryption/decryption system mostly depends upon a system that manages encryption keys. One of the most important items in such an encryption/decryption system is how an encryption key is derived. It is also important to manage and update the derived encryption key.

The BE has greatly been changed since its concept was originally proposed, in 1991. The current BE assumes a stateless receiver. This means that secret keys of respective users are not changed or updated at all according to the change of session. In this case, a term 'k-resilient' is used for security, and means that information cannot be resilient even if k users among revoked users deliver a traitor attack. Since 'r' indicates the number of revoked users, the term 'r-resilient' means that the information is secured even if all the revoked users deliver the traitor attack.

Meanwhile, in the BE, a transmission overhead (i.e., overhead in transmitting a header by a transmitter side), a storage overhead (i.e., overhead is storing a secret key by the user), and a computation overhead (i.e., overhead in obtaining a session key for the user) are regarded as important, and mean. Among them, the reduction of the transmission overhead is an important problem to be solved. The transmission overhead was in proportion to the total number of users N at an initial stage, but at present, it is reduced so that it is mainly in proportion to the number r of revoked users. As schemes for making the transmission overhead in proportion to the number r of revoked users are appearing, the reduction of the transmission overhead less than r becomes an important problem to be solved in the BE.

Among the results published up to now based on the BE problem, as described above, "Subset Difference (SD) Method" published by Naor-Naor-Lotspiech shows one of the better results. In the SD method, if the total number of users is n, a storage overhead of $O(\log^{1+e} n)$ and a transmission overhead of $O(2r-1)$ are required.

However, the SD method has a problem in efficiency in the case in which plural users use the method.

As described above, diverse algorithms have been proposed since a treatise on the BE was first published by Berkovits in 1991. Among them, important algorithms of a secret sharing type, a subset cover-free system model type, a type using a tree structure have been proposed.

First, a model based on the secret sharing will briefly be explained. The secret sharing mode was first proposed by S. Berkovits in 1991, and an efficient improvement thereof was described in a treatise entitled "Efficient Trace and Revoke Schemes" announced by 'M. Noar' and 'B. Pinkas' in 2000. In "How to Broadcast a Secret" announced by S. Berkovits, a method using a polynomial interpolation and a method using a vector based secret sharing were proposed.

According to the polynomial interpolation, the center (i.e., a broadcast center or transmitter) transmits a point $(x_i, y_i)$ to the respective users through secret channels. At this time, $x_i$ is a value different from each other, and $(x_i, y_i)$ is the secret key of the respective user. Then, the center selects a polynomial having a random integer j and a degree of t+j+1 in order to broadcast secret information S to t authorized users of the respective session. The polynomial P is not a secret key $(x_i, y_i)$ of the t users or of any other user, but passes certain j points (x, y) and (0, S). Also, the center transmits other points different from the t+j points on the polynomial P. Accordingly, the t fair users know one point (i.e., the user's own secret key) in addition to the t+j points, and thus they can restore the polynomial P and obtain the secret information S. However, the revoked users cannot restore the polynomial P.

This method requires the transmission overhead of $O(t+j+1)$, storage overhead of $O(1)$, and computational overhead of $t^3$ times multiplications. Additionally, this method has the advantages of easy revocation, prevention against a traitor attack, and possible traitor tracing. However, it is inefficient with respect to a large number of users and its repeated use may destroy its security, so that it experiences problems in the application.

"Effective Trace and Revoke Schemes" announced by M. Noar and B. Pinkas describes a threshold secret sharing system using Lagrange's interpolation formula. According to the Noar-Pinkas method, an r-degree polynomial can be restored if r+1 points on the polynomial are known. However, it is not impossible to restore the polynomial using r points on the polynomial. Specifically, the center selects a certain t-degree polynomial P, and provides different points on the polynomial to the users as the secret key. If r users are revoked, the center broadcast information about t points in total by adding the secret keys of r revoked users and voluntarily selected t-r points. As a result, the revoked users still know only t points even if the secret information of the revoked users is added.

However, the authorized users know t+1 points, and thus the user can restore the polynomial P. Then, using this polynomial, the value of the session key P(0) is obtained.

This method also has the advantages of easy revocation, prevention against a traitor attack, and possible traitor tracing. Particularly, it has the advantage in that new users can be added, and is considerably efficient in transmission overhead (e.g., 0(t)) and storage overhead (e.g., 0(1)). However, this method has the problem in that it is impossible to revoke the users the number of which is larger than t. Additionally, the computation overhead required for the computation of the number of points or the polynomial to be transmitted depends upon t, causing inefficiency in use. Additionally, with the increase of t, the computation time is greatly increased, and thus it is difficult for a large number of users to simultaneously use this method.

Second, assuming that a set of all users is S, the subset cover-free system model defines a concept of a subset cover-free system in a set having subsets of S as its elements. If such a system can be found, the BE can be performed using the system. However, the system has a drawback in that its storage overhead and transmission overhead are in the range of 0(r log n), and thus, inefficient. Additionally, a method of making a k-resilient model by extending a 1-resilient model has been introduced. Since the efficient 1-resilient strategy can be relatively easily conceived, it is considered that such an extension is significant. However, the method already proposed greatly reduces the efficiency of the system.

Third, methods using a tree structure have recently been noticed. A logical-tree-hierarchy (LTH) method was proposed by C. K. Wong, M. Gouda and G. S. Lam in 1998. According to this method, it is immoderate to revoke a large number of users in one session. Also, since secret keys of users are changed with the lapse of sessions, this method differs from the modern BE that assumes a stateless receiver. Thereafter, "Complete Subset (CS) Cover Scheme" and "Subset Difference (SD) Scheme" were proposed by D. Naor, M. Naor, and J. Lotspiech in 2001. In both methods, it is assumed that the total number of users is n and the number of revoked users is r. A center is provided with a binary tree having a height of log n, and all nodes are allocated with the corresponding secrete keys. Leaf nodes are allocated to users, one by one.

According to the CS cover method, the respective user receives secret keys, from the center, of all nodes positioned on a path between the root node and the user's own leaf node. The respective user then stores the received secret keys. Here, a subtree that does not include even a revoked user among subtrees is called a "complete subtree (CS)". By properly selecting the CS, all the non-revoked users can be included in the subtree. At this time, if the session key is encrypted by the secret key corresponding to the root node of the used CSs and the encrypted session key is transmitted, the authorized user can restore the session key. However, the revoked user cannot restore the session key because it is not included in any used CS.

Figure 2:
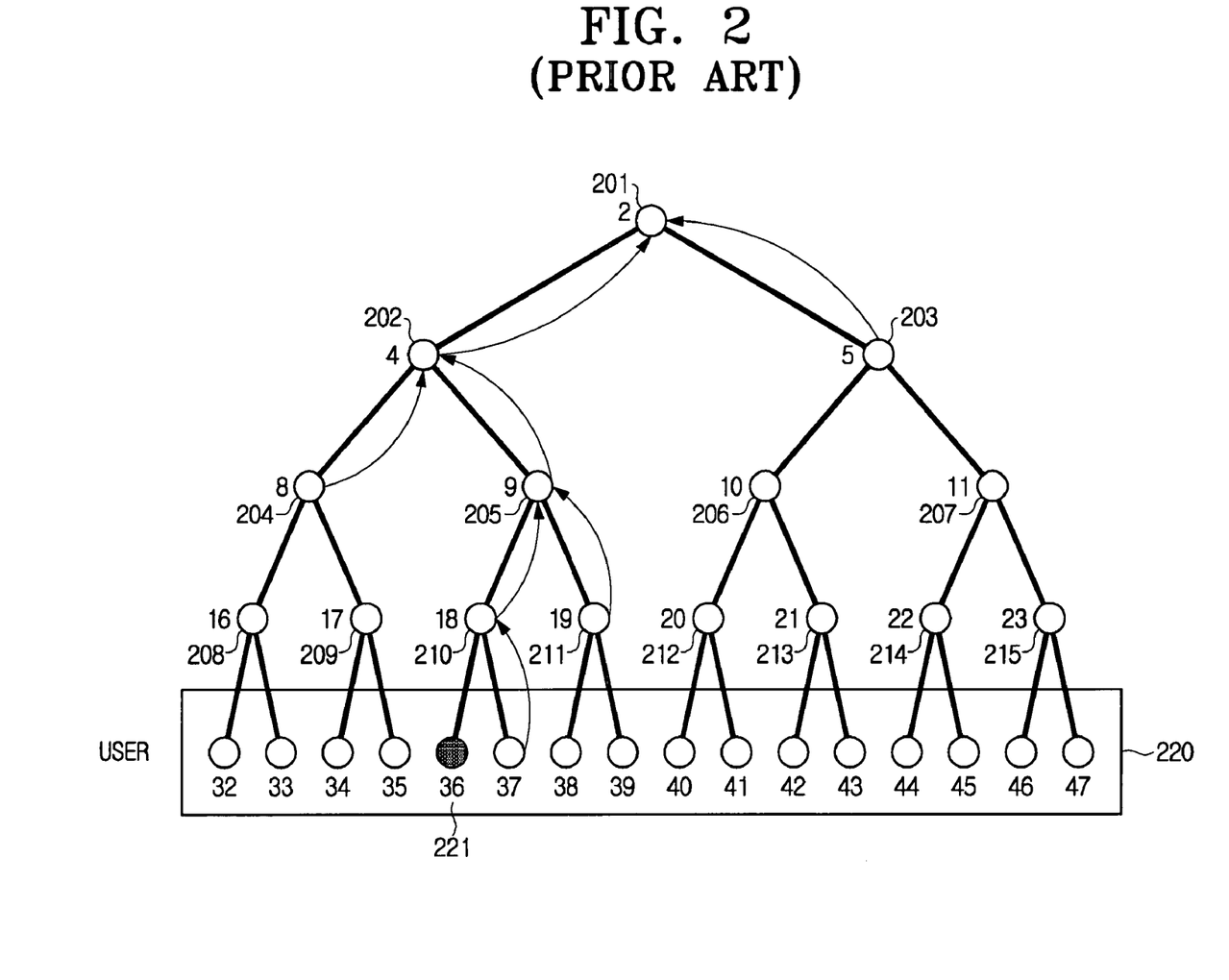
FIG. 2 is a view explaining the concept of a broadcast encryption that allocates keys to the conventional tree structure.

FIG. 2 is a view explaining the concept of the broadcast encryption that allocates keys to the conventional tree structure. Referring to FIG. 2, the respective users 220 who receive data through the broadcast encryption system have their own key values (for example, $32^{nd}$ to $47^{th}$ users), and simultaneously have the key values of the respective nodes connected to the respective users on the tree structure.

For example, $34^{th}$ user has the key value of $17^{th}$ node 209, the key value of $8^{th}$ node 204, the key value of $4^{th}$ node 202 and the key value of $2^{nd}$ node 201, in addition to its own key value, i.e., the key value of the $34^{th}$ node. The key value of $17^{th}$ node 209 that the $34^{th}$ user has is also shared with the $35^{th}$ user. In a similar manner, the key value of $8^{th}$ node 204 that the $34^{th}$ user has is also shared with the $32^{nd}$, $33^{rd}$, and $35^{th}$ users.

Meanwhile, if the $32^{nd}$ to $47^{th}$ users are all authorized users, data is simultaneously transmitted to all the users with the key value of the $2^{nd}$ node 201 included in a header part of the data, so that the security of the data can be maintained.

However, if the user having the key of the $36^{th}$ user 221 is not an authorized user, but a revoked user, it is necessary to update the key values of the node related to the $36^{th}$ user 221 since the corresponding key values are shared with other users. That is, the key values of the $18^{th}$ node 210, $9^{th}$ node 205, $4^{th}$ node 202 and $2^{nd}$ node 201 should be updated. This update of the key value is performed from a lower node to an upper node.

First, since the key value of the $18^{th}$ node 210 is shared with the $37^{th}$ user, the updated key value of the $18^{th}$ node 210 is encrypted by the key value of the $37^{th}$ user, and then the encrypted key value is transmitted from the server to the $37^{th}$ user. Then, since the key value of the $9^{th}$ node 205 is shared with the $37^{th}$ user and with the $38^{th}$ and $39^{th}$ users positioned below the $19^{th}$ node 211, the updated key value of the $9^{th}$ node 205 is encrypted by the key value of the $18^{th}$ node 210 which has already been updated and the encrypted key value is transmitted to the $37^{th}$ user, while it is also encrypted by the key value of the $19^{th}$ node 211 and the encrypted key value is transmitted to the $38^{th}$ and $39^{th}$ users.

In a similar manner, since the key value of the $4^{th}$ node 202 is shared with the $32^{nd}$, $33^{rd}$, $34^{th}$ and $35^{th}$ users positioned below the $8^{th}$ node 204 and with the $37^{th}$, $38^{th}$ and $39^{th}$ users positioned below the $9^{th}$ node 205, the updated key value of the $4^{th}$ node 202 is encrypted by the key value of the $8^{th}$ node 204 to be transmitted to the $32^{nd}$ to $35^{th}$ users, while it is also encrypted by the key value of the $9^{th}$ node 205 which has already been updated to be transmitted to the $37^{th}$, $38^{th}$ and $39^{th}$ users.

Last, since the key value of the $2^{nd}$ node 201 is shared with all the users except for the $36^{th}$ user 221 i.e., the $32^{nd}$ to $35^{th}$ and $37^{th}$ to $39^{th}$ users positioned below the $4^{th}$ node 204 and with the $40^{th}$ to $47^{th}$ users positioned below the $5^{th}$ node 203, the updated key value of the $2^{nd}$ node 201 is encrypted by the key value of the $4^{th}$ node 202 which has already been updated to be transmitted to the $32^{nd}$, $33^{rd}$, $34^{th}$, $35^{th}$, $37^{th}$, $38^{th}$, and $39^{th}$ users, while it is also encrypted by the key value of the $5^{th}$ node 203 to be transmitted to the $40^{th}$ to $47^{th}$ users. Through this key updating process, illegal (or revoked) user's access to the data can be intercepted and prevented.

The transmission overhead in the above-described method (i.e., CS model) is 0(r log (n/r)). That is, the transmission overhead is the number of CSs that only includes all of the non-revoked users, and the storage overhead is 0(log n).

Meanwhile, the subset difference (SD) method is a modification of the above-described CS model, and remarkably improves the transmission overhead by requesting the storage overhead of $0(\log^2 n)$ and the transmission overhead of 0(2r−1). The SD model considers a subtree obtained by subtracting a subtree that contains one node w included in another subtree as its root node from the corresponding subtree that contains another node v as its root node. Leaf nodes under this subtree denote the authorized users, and the lead nodes under the subtree having the node w as its root node denote the revoked users. If any revoked user is inserted among the proper number of authorized users, the SD model can cover it with one subset unlike the CS model that necessarily requires two or more subsets.

According to the SD method, the hash values from the hash value of the key allocated to the node v to the hash value of the key allocated to the node w are obtained, and the values corresponding to the obtained values are used as the session keys. The respective user has the hash values of sibling nodes to respective nodes on a path from the root node to the user's own leaf node as the user's secret keys. Accordingly, using the unidirectional property of the hash function, the session keys of the authorized users can be restored. This SD model has the transmission overhead of O(2r−1), the storage overhead of O($\log^2$ n) and the computation overhead of O(log n).

Thereafter, an LSD model that is an improvement of the SD model was proposed in 2002. According to the LSD model, the storage overhead is reduced to O($\log^{3/2}$ n) by using a layer in the respective subtree, but the transmission overhead is double the transmission overhead of the SD model.

The models using the tree structure such as the LSD, SD, and so on, among the above-described BE models, show a better efficiency. However, in the case of the methods using the tree structure, the number of subsets required for the broadcast greatly depends upon the positions of the users, and thus, it is difficult to expect further improvements. Additionally, in the case of the tree structure, maintenance and repair is rather costly. Accordingly, instead of the above-described method using the tree structure, more efficient BE schemes are required.

SUMMARY OF THE INVENTION

The present invention has been developed in order to solve the above drawbacks and other problems associated with the conventional arrangement. Illustrative, non-limiting embodiments of the present invention may overcome the above disadvantages and other disadvantages not described above. The present invention is not necessarily required to overcome any of the disadvantages described above, and the illustrative, non-limiting embodiments of the present invention may not overcome any of the problems described above. The appended claims should be consulted to ascertain the true scope of the invention.

An aspect of the present invention is to provide a method of managing a user key for a broadcast encryption that successively constructs hash chains, by nodes using a ring-shaped structure, and distributes key values.

Another aspect of the present invention is to provide a method of managing a user key for a broadcast encryption that can reduce the transmission overhead of session keys being transferred to the nodes by successively constructing hash chains, by nodes using a ring-shaped structure.

Yet another aspect of the present invention is to provide a method of managing a user key for a broadcast encryption that can reduce the transmission overhead by setting a transmission interval by adding, to the transmission interval, an interval that includes one revoked user.

According to an aspect of the present invention, a method of managing a user key for a broadcast encryption is provided. The method comprises assigning numbers to respective users and arranging the users on a ring-shaped structure of nodes in order to map hash chains onto respective nodes of the ring-shaped structure. The method further includes making random node keys correspond to the respective nodes, one by one, constructing the hash chains from the corresponding node keys using a hash function, and successively mapping the constructed hash chains onto the nodes of the ring-shaped structure.

BRIEF DESCRIPTION OF THE DRAWINGS

The above aspects and features of the present invention will be more apparent by describing in detail certain exemplary embodiments of the present invention with reference to the accompanying drawings. In the drawings, the same reference characters denote analogous elements, in which.

DETAILED DESCRIPTION OF THE EXEMPLARY, NON-LIMITING EMBODIMENTS

Exemplary, non-limiting embodiments of the present invention will be described in greater detail with reference to the accompanying drawings. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 3:
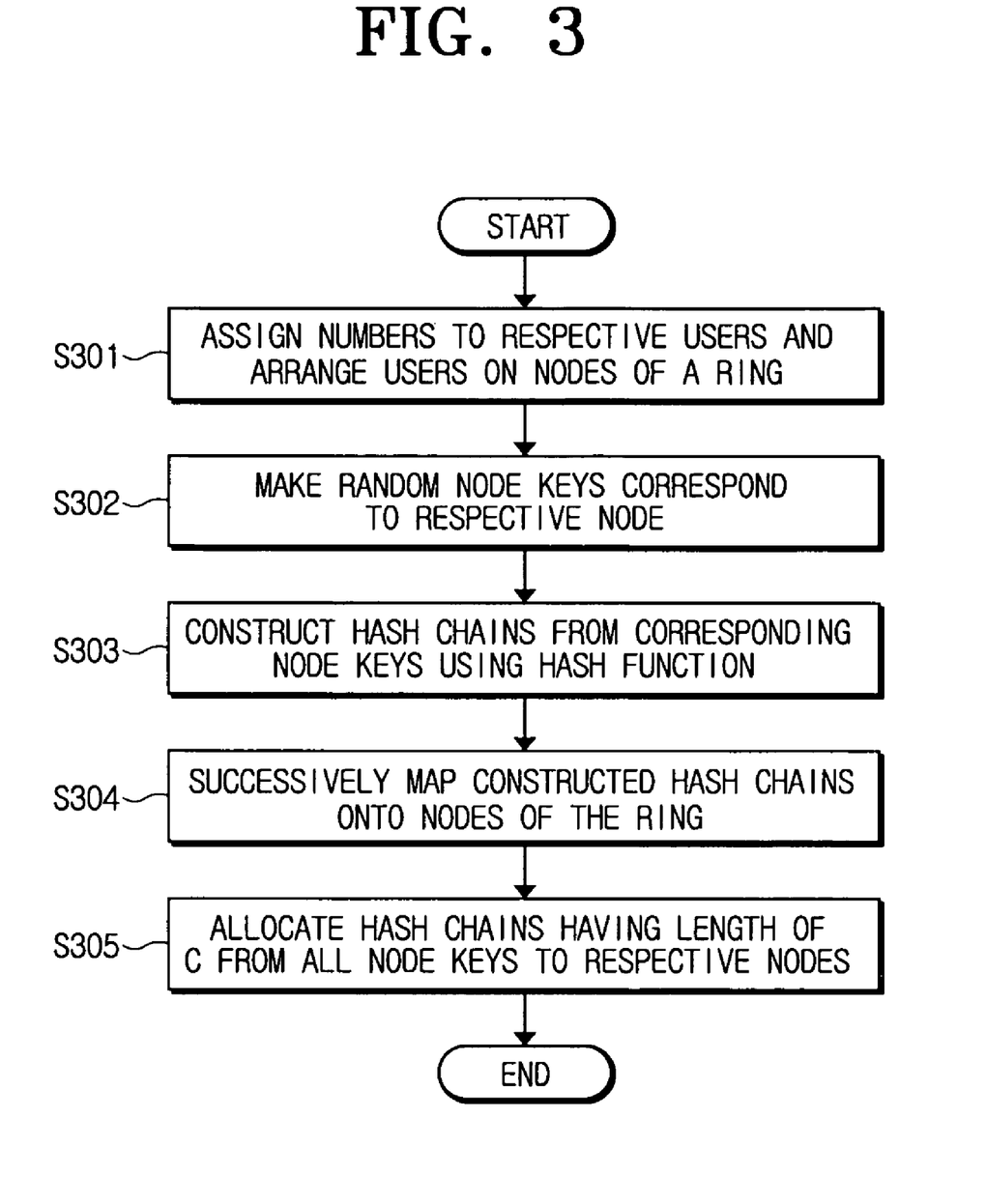
FIG. 3 is a flowchart illustrating a procedure of assigning key values by mapping hash chains onto respective nodes of a ring-shaped structure according to an illustrative, non-limiting embodiment of the present invention.

FIG. 3 is a flowchart illustrating a procedure of assigning key values by mapping hash chains onto respective nodes of a ring-shaped structure according to an illustrative, non-limiting embodiment of the present invention.

Referring to FIG. 3, in order to map hash chains onto respective nodes of a ring-shaped structure, numbers are assigned to respective user, and the respective users are arranged on the nodes of a ring-shaped structure (operation S301). Then, random node keys are made to correspond to the respective node, one by one (operation S302).

Then, hash chains are constructed from the corresponding node keys using a hash function (operation S303), and the constructed hash chains are successively mapped onto the nodes of the ring-shaped structure (operation S304). Lastly, the hash chains constructed from all of the node keys using the hash function are allocated to the respective nodes (operation S305) to complete the procedure of assigning the key values to users.

Hereinafter, the procedure of mapping the node keys will be explained in more detail with reference to FIGS. 4 to 6.

Figure 4:
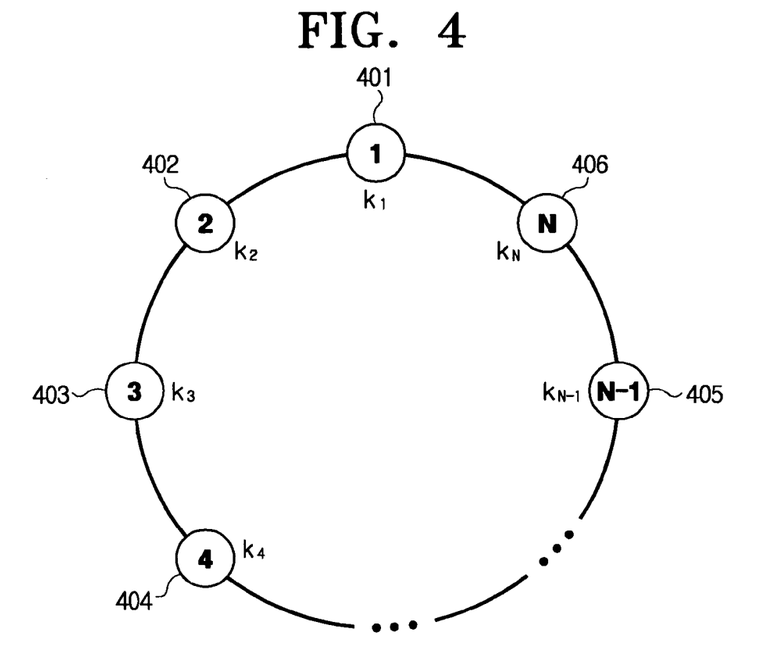
FIG. 4 is a view explaining a method of making random key values correspond to respective nodes of a ring-shaped structure according to an illustrative, non-limiting embodiment of the present invention.

FIG. 4 shows a method of making the random key values correspond to the respective nodes of a ring-shaped structure according to an illustrative, non-limiting embodiment of the present invention. Referring to FIG. 4, the hash chain values can successively be mapped onto the respective nodes of the ring-shape structure. For example, if it is assumed that N nodes are arranged in the same space, randomly selected key values $K_1, K_2, \ldots, K_N$ may correspond to the respective nodes, one by one. That is, the randomly selected key value $K_1$ corresponds to the first node 401, $K_2$ to the second node 402, $K_3$ to the third node 403, $K_4$ to the fourth node 404, ..., $K_{N-1}$ to the (N-1)th node 405, and $K_N$ to the N node 406, respectively.

The hash chains are constructed from the respective node keys using a hash function. The exemplary method of constructing the hash chains is as follows.

If h is a unidirectional hash function in that $\{0,1\}^{128} \rightarrow \{0,1\}^{128}$, the hash chains having a length of c from K become $\{K, h(K), h(h(K))=h^{(2)}(K), \ldots, h^{(c-1)}(K)\}$. The constructed hash chain values successively correspond to the respective nodes of a circle from the head of the circle.

Figure 5:
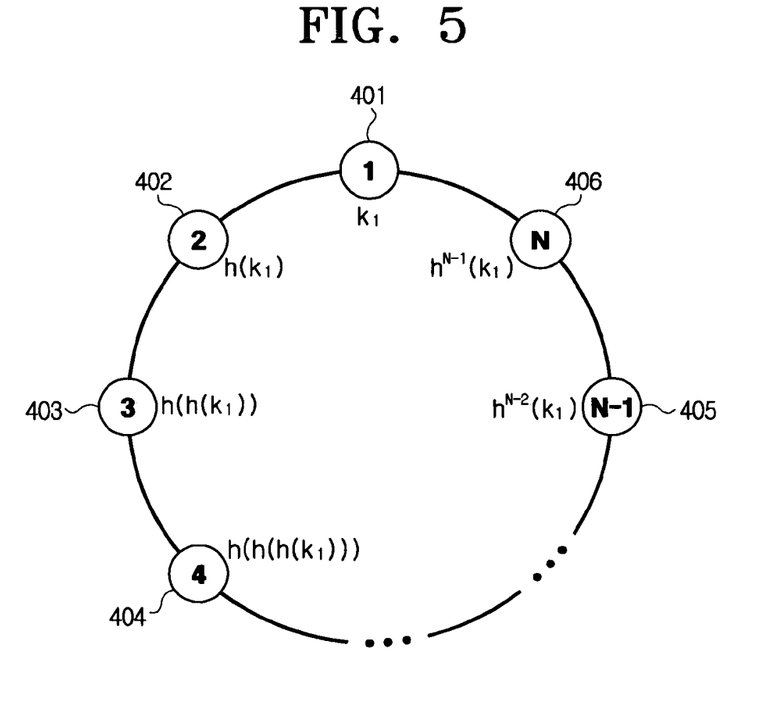
FIG. 5 is a view explaining a method of mapping hash chains onto the respective nodes of a ring-shaped structure according to an illustrative, non-limiting embodiment of the present invention.

FIG. 5 is a view explaining an exemplary method of mapping hash chains onto the respective nodes of a ring-shaped structure according to an illustrative, non-limiting embodiment of the present invention. Using the unidirectional hash function h, the hash chain, which starts from the respective node and which has a length of c, is constructed and mapped onto the respective node.

Referring to FIG. 5, the key value $K_1$ is mapped onto the first node 401, the key value $h(K_1)$ is mapped onto the second node 402, $h(h(K_1))$ onto the third node 403, $h(h(h(K_1)))$ onto the fourth node 404, ..., $h^{(N-2)}(K_1)$ onto the N-1$^{th}$ node 405, and $h^{(N-1)}(K_1)$ onto the N-th node 406, respectively.

Figure 6:
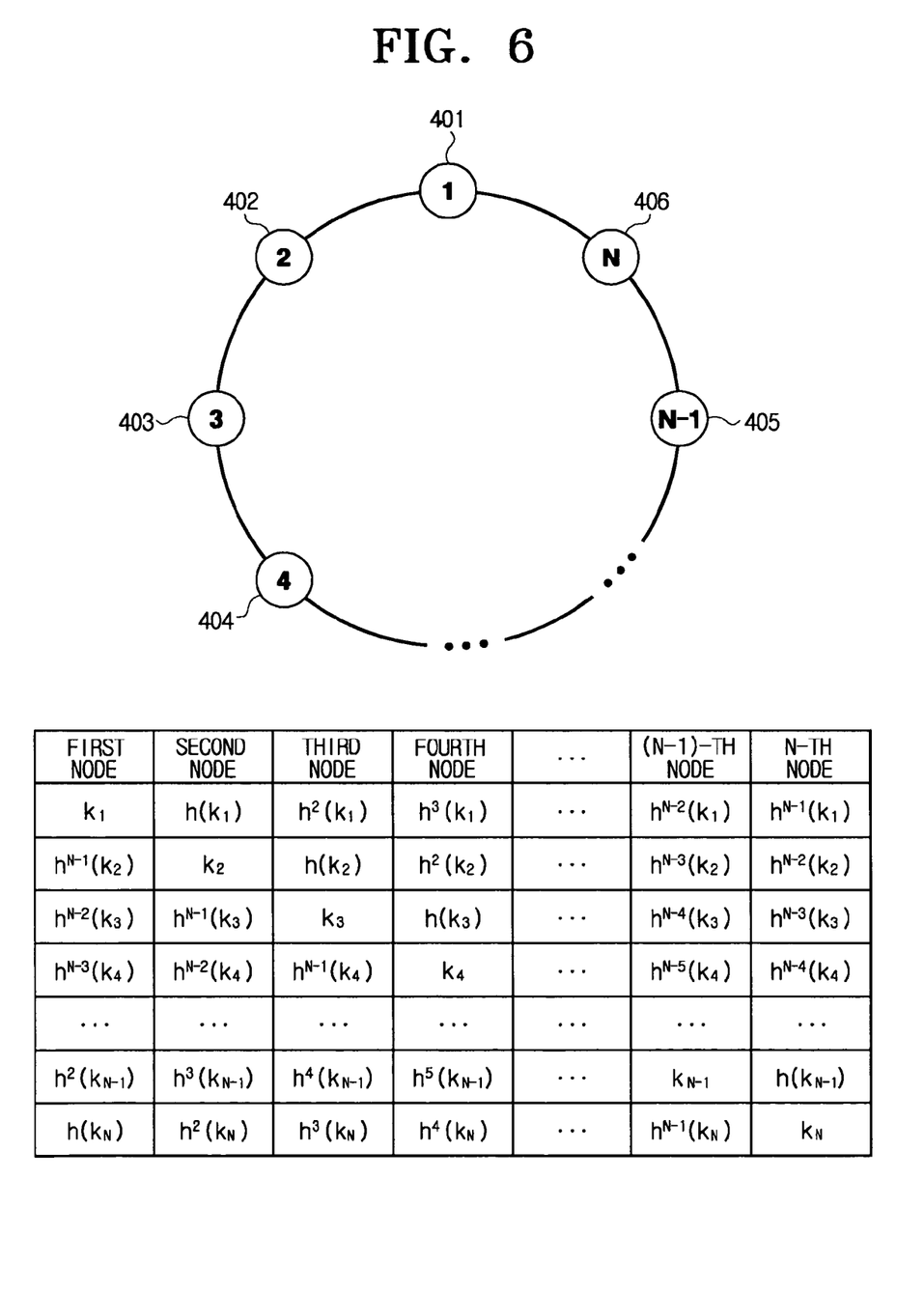
FIG. 6 is a view explaining a method of making key values correspond to respective nodes of a ring-shaped structure according to an exemplary, non-limiting embodiment of the present invention.

FIG. 6 shows a method of making key values correspond to the respective nodes of a ring-shaped structure according to an illustrative, non-limiting embodiment of the present invention. Hereinafter, the exemplary method of making node keys allocated to the first node 401 correspond to the respective nodes will be explained. Referring to FIG. 6, the key value $K_1$ is allocated to the first node 401 and the key value $h(K_1)$, obtained by hashing the key value $K_1$, is allocated to the second node 402. The key value $h(h(K_1))$, obtained by hashing the key value allocated to the second node 402, is allocated to the third node 403. The key value $h^{(N-1)}(K_1)$, obtained by hashing the key value allocated to the (N-1)$^{th}$ node 405, is allocated to the N-th node 406.

Next, the exemplary method of making node keys allocated to the second node 402 correspond to the respective nodes will be explained. Referring to FIG. 6, the key value $K_2$ is allocated to the second node 402 and the key value $h(K_2)$, obtained by hashing the key value $K_2$, is allocated to the third node 403. The key value $h(h(K_2))$, obtained by hashing the key value allocated to the third node 403, is allocated to the fourth node 404. The key value $h^{(N-2)}(K_2)$, obtained by hashing the key value allocated to the (N-1)-th node 405, is allocated to the N-th node 406.

Furthermore, the exemplary method of making node keys allocated to the N-th node 406 correspond to the respective nodes will be explained. Referring to FIG. 6, the key value $K_N$ is allocated to the N-th node 406 and the key value $h(K_N)$, obtained by hashing the key value $K_N$, is allocated to the first node 401. The key value $h(h(K_N))$, obtained by hashing the key value allocated to the first node 401, is allocated to the second node 402. The key value $h^{(N-1)}(K_N)$, obtained by hashing the key value allocated to the (N-2)-th node, is allocated to the (N-1)-th node 405.

By performing the above-described process, N key values are allocated to the respective nodes arranged in the ring-shaped structure, as illustrated in FIG. 6.

Figure 7:
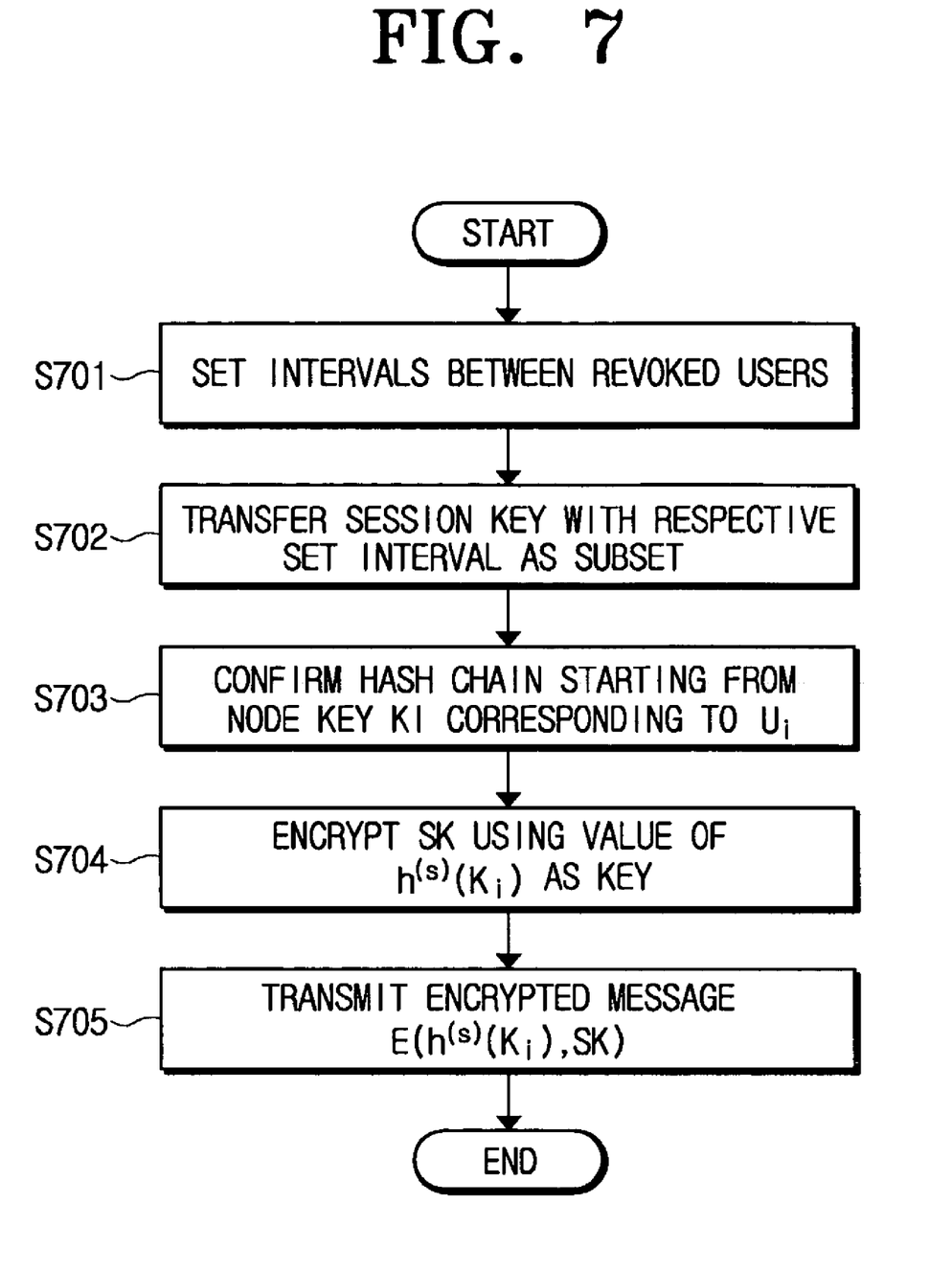
FIG. 7 is a flowchart illustrating a procedure of transferring a session key to an interval between revoked users according to an illustrative, non-limiting embodiment of the present invention.

FIG. 7 is a flowchart illustrating the procedure of transferring a session key to an interval between revoked nodes, according to an illustrative, non-limiting embodiment of the present invention. Referring to FIG. 7, a successive arrangement of authorized (i.e., privileged) nodes located between the revoked nodes is defined as an interval, and the interval between the revoked nodes is set (operation S701) to transfer the session key.

Then, the session key is transferred with the respective set interval considered as a subset (operation S702).

Figure 8:
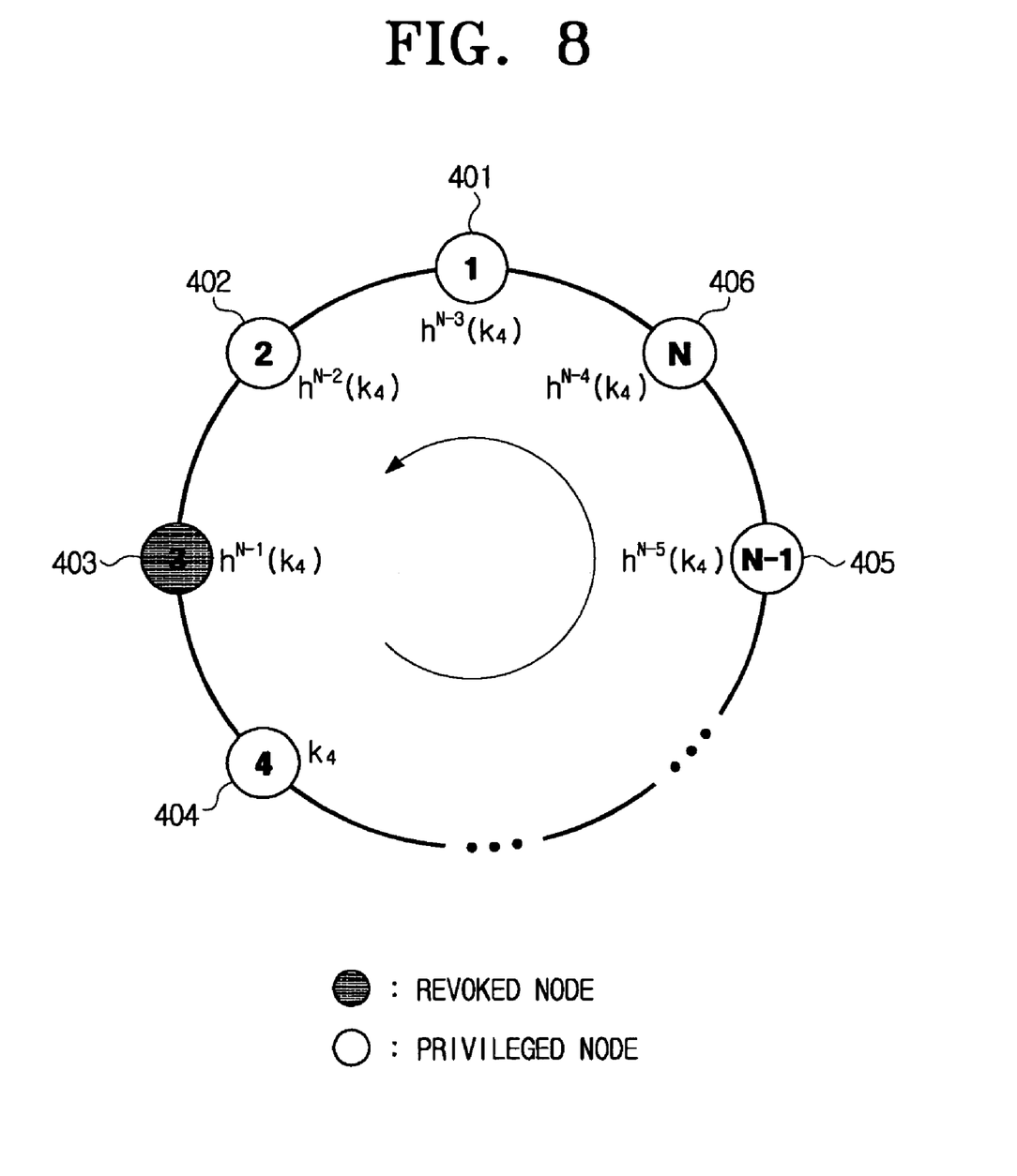
FIG. 8 is a view explaining the definition of an interval on a ring-shaped structure according to an illustrative, non-limiting embodiment of the present invention.

FIG. 8 is a view explaining the definition of an interval on a ring-shaped structure according to an illustrative, non-limiting embodiment of the present invention. Referring to FIG. 8, an interval is defined as a gathering of successive privileged nodes except for the revoked node 403.

After the setting of the interval, as described above, the hash chain that starts at the node key $K_i$ corresponding to $U_i$ is checked (operation S703), and the session key (SK) is encrypted using the value $h^{(s)}(K_i)$ to transmit the encrypted session key, where s depends on the location of the node with respect to the node that has the key $K_i$. Consequently, the encrypted message is transmitted (operation S705).

Referring again to FIG. 8, since the third node 403 is the revoked node, the interval that is the gathering of the privileged nodes can be taken by moving counterclockwise from the fourth node 404 to the second node 402. In order to transfer the session key (SK) with respect to the interval, the broadcast center uses the hash chain starting from the node key $K_4$ allocated to the fourth node 404. Using the value of $h^{(N-2)}(K_4)$, which is a key value corresponding to the second node 402 that is the node located prior to the revoked node among the hash chain values as the key, the session key is encrypted and transmitted. That is, if E(K, M) is a symmetric encryption algorithm using K as the key, a message of $E(h^{(N-2)}(K_4), SK)$ is transmitted to all nodes.

Meanwhile, the only nodes that can decrypt the transmitted message by the pre-assigned key values as above are the nodes that can obtain the key of $h^{(N-2)}(K_4)$. Accordingly, only the nodes included in the interval can obtain the corresponding key values.

Since the node included in the interval can recognize the value of one among the hash chains starting from $K_4$ and the value is located clockwise from $h^{(N-2)}(K_4)$, the node can obtain the value of $h^{(N-2)}(K_4)$ by applying the hash function h to its own value. By contrast, the third node 403, although it may obtain a partial value of the hash chain, cannot obtain the previous value of the hash chain because of the unidirectional property of the hash function.

Figure 9:
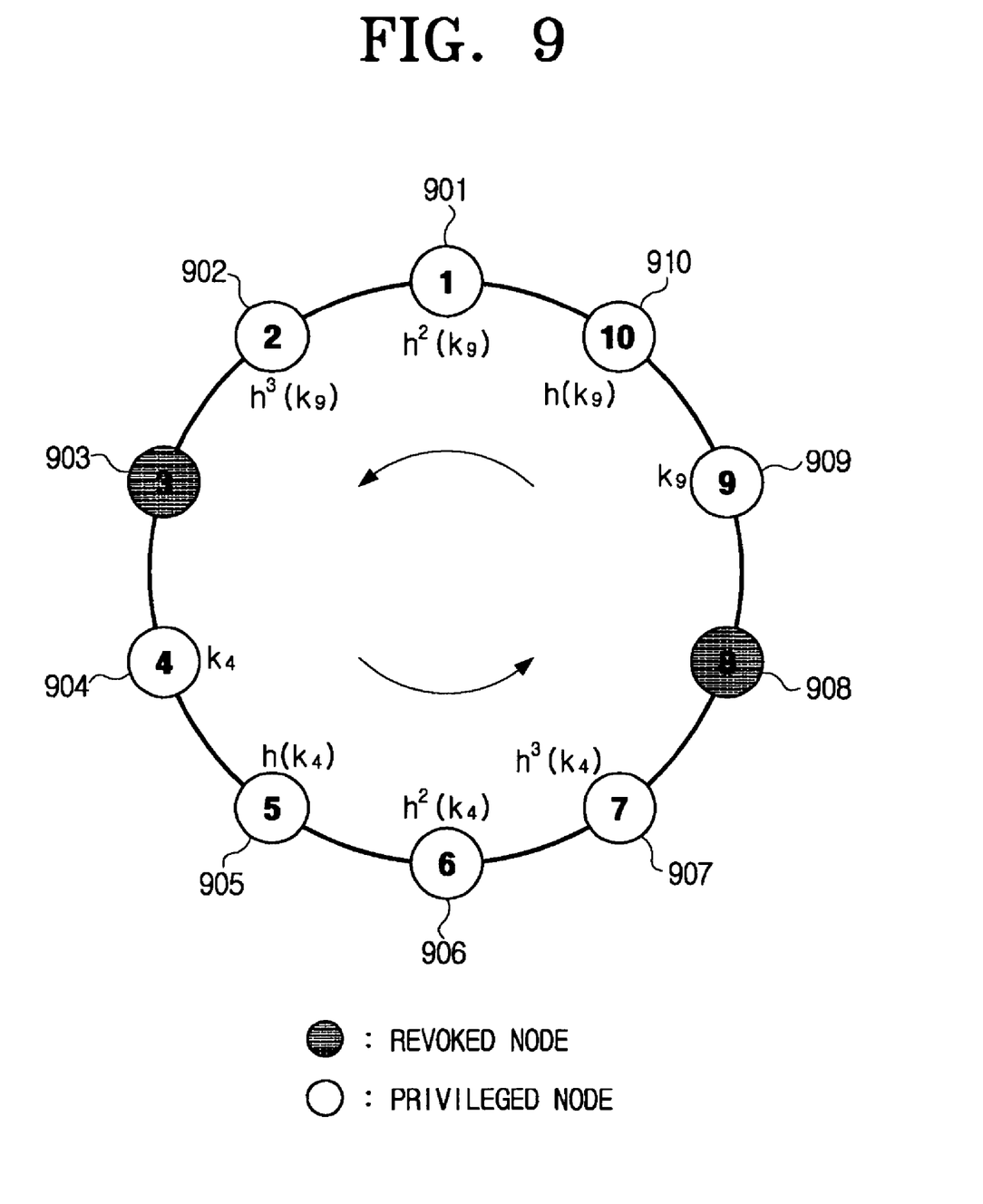
FIG. 9 is a view explaining a method of transferring a session key to two intervals on a ring-shaped structure according to an illustrative, non-limiting embodiment of the present invention.

FIG. 9 is a view explaining a method of transferring a session key to intervals of a ring structure according to an exemplary embodiment of the present invention. In the exemplary structure depicted in FIG. 9, the number of nodes N is equal to 10. FIG. 9 illustrates that two nodes are revoked among nodes of a linear structure. Since the third node 903 and the eighth node 908 are the revoked nodes, the interval of the privileged nodes can be created by moving counterclockwise from the fourth node 904 to the seventh node 907 and moving counterclockwise from the ninth node 909 to the second node 902.

In order to transfer the session key (SK) with respect to the intervals, the service provider uses the hash chain starting from the node key $K_4$ allocated to the fourth node 904 and the node key $K_9$ allocated to the ninth node 909. The service provider encrypts and transmits the session key using the value of $h^3(K_4)$, which is a key value corresponding to the seventh node 907 among the hash chain values, and simultaneously encrypts and transmits the session key using the value of $h^3(K_9)$ which is a key value corresponding to the second node 902 among the hash chain values. That is, if E(K, M) is a symmetric encryption algorithm using K as the key, messages of $E(h^3(K_4), SK)|E(h^3(K_9), SK)$ are transmitted to all users or nodes of the structure depicted in FIG. 9.

Meanwhile, the users who can decrypt the transmitted message by the pre-assigned key values as above are only the users that can obtain the keys of $h^3(K_4)$ and $h^3(K_9)$. Accordingly, only the nodes included in the intervals can obtain the corresponding key values.

That is, the fourth node 904 to the seventh node 907 can obtain $h^3(K_4)$ using their own key values, and the ninth node 909 to the second node 902 (nodes 909, 910, 901, and 902) can obtain $h^3(K_9)$ using their own key values.

The nodes on the ring-shaped structure can store the encryption keys for encrypting the session keys. For example, it is assumed that the nodes on the ring-shaped structure are first to tenth node. As described above, the respective nodes are allocated with the node keys and store the allocated node keys. The first node is allocated with $K_1$, the second node $K_2$, and the tenth node $K_{10}$. Hereinafter, the second exemplary scheme for allocating the node keys allocated to the first node through the tenth node will be explained.

It is assumed that one of the second to tenth nodes that constitute the ring-shaped structure is revoked. Specifically, it is assumed that the second node is revoked. In this case, the third node is allocated with and stores $h(K_1)$, the fourth node $h^2(K_1)$, the ninth node $h^7(K_1)$ and the tenth node $h^8(K_1)$, respectively.

When the third node is revoked, the second node is allocated with and stores $h(K_1)$, and the fourth node is allocated with and stores $h^2(K_1)$. The ninth node is allocated with and stores $h^7(K_1)$ and the tenth node is allocated with and stores $h^8(K_1)$.

When the tenth node is revoked, the second node is allocated with and stores $h(K_1)$, and the third node is allocated with and stores $h^2(K_1)$. The eighth node is allocated with and stores $h^7(K_1)$ and the ninth node is allocated with and stores $h^8(K_1)$.

The node keys allocated to and used by the second to tenth nodes are also allocated to the respective nodes in the above-described method. Specifically, in the case of using the method proposed with reference to FIGS. 3 to 9, the encryption keys should be derived by intervals if two nodes among nodes on the ring-shaped structure are revoked. That is, as illustrated in FIG. 9, in the case in which the third node 903 and the eighth node 908 are revoked, the service provider provides the service using $E(h^3(K_4), SK)|E(h^3(K_9), SK)$. However, according to the second exemplary scheme described above, the service provider provides the service using $E(h^7(K_4), SK)$, and thus the transmission overhead of the session key can be reduced.

Figure 10:
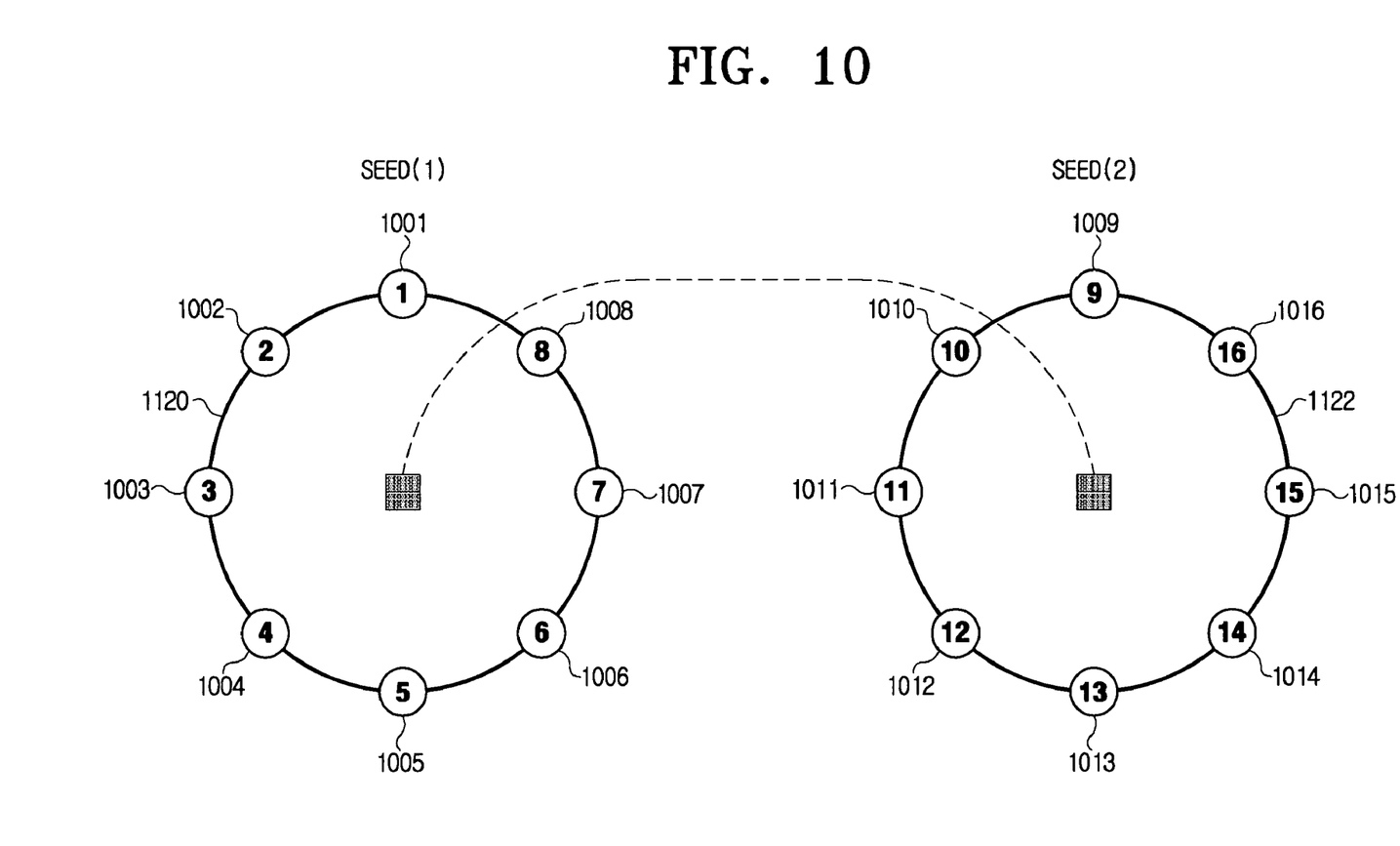
FIG. 10 is a view illustrating two ring-shaped structures constituted by nodes according to an illustrative, non-limiting embodiment of the present invention.

FIG. 10 is a view illustrating a method of transferring a session key to intervals on ring-shaped structures according to an exemplary, non-limiting embodiment of the present invention. FIG. 10 illustrates two ring-shaped structures. Referring to FIG. 10, a scheme for managing the nodes using two ring-shaped structures has been proposed instead of managing the nodes using one ring-shaped structure.

The two ring-shaped structure as illustrated in FIG. 10 are called a first ring-shaped structure 1120 and a second ring-shaped structure 1122. The first ring-shaped structure 1120 is composed of a first node 1001 to an eighth node 1008, and the second ring-shaped structure 1122 is composed of a ninth node 1009 to a $16^{th}$ node 1016. In the exemplary, non-limiting embodiment of the present invention, the nodes that constitute the first ring-shaped structure 1120 share keys of the second ring-shaped structure 1122, and the nodes that constitute the second ring-shaped structure 1122 share keys of the first ring-shaped structure 1120. Hereinafter, the keys allocated to the first node 1001 that constitutes the first ring-shaped structure 1120 will be explained. The second node 1002 to the eighth node 1008 of the first ring-shaped structure 1120 and the ninth node 1009 to the $16^{th}$ node 1016 of the second ring-shaped structure 1122 are allocated with the keys in the same manner as the first node 1001.

If the nodes of the first ring-shaped structure and the second ring-shaped structure constitute a group, the first node 1001 is allocated a group key. That is, the group key is allocated to all the nodes that constitute the first ring-shaped structure 1120 and the second ring-shaped structure 1122. Additionally, since the first node 1001 constitutes the first ring-shaped structure 120, it is allocated with a first seed key SEED(1). The first seed keys $SEED(1)_1$ to $SEED(1)_8$ are allocated to the nodes that constitute the first ring-shaped structure 1120. In addition, the first node 1001 is allocated with keys usable in the first ring-shaped structure 1120, as illustrated in FIG. 6.

The first node 1001 is allocated with second seed keys $SEED(2)_9$ to $SEED(2)_{16}$ in order to share the keys with the second ring-shaped structure 1122. Specifically, the nodes that constitute the first ring-shaped structure 1120 and the nodes that constitute the second ring-shaped structure 1122 use a general function G in order to share the keys. Generally, it is preferable to use a unidirectional function as the general function in the same manner as the hash function.

The second seed keys allocated to the first node 1001 are $G(SEED(2))_9, HG(SEED(2))_{10}, H^2G(SEED(2))_{11}, \ldots, H^7G(SEED(2))_{16}$.

As described above, the nodes that constitute the ring-shape structure are allocated with four kinds of keys. That is, the four kinds of keys are: the group key, the seed key, the key for use in the node's ring-shaped structure, the seed key for use in another ring-shaped structure, and so on.

Figure 12:
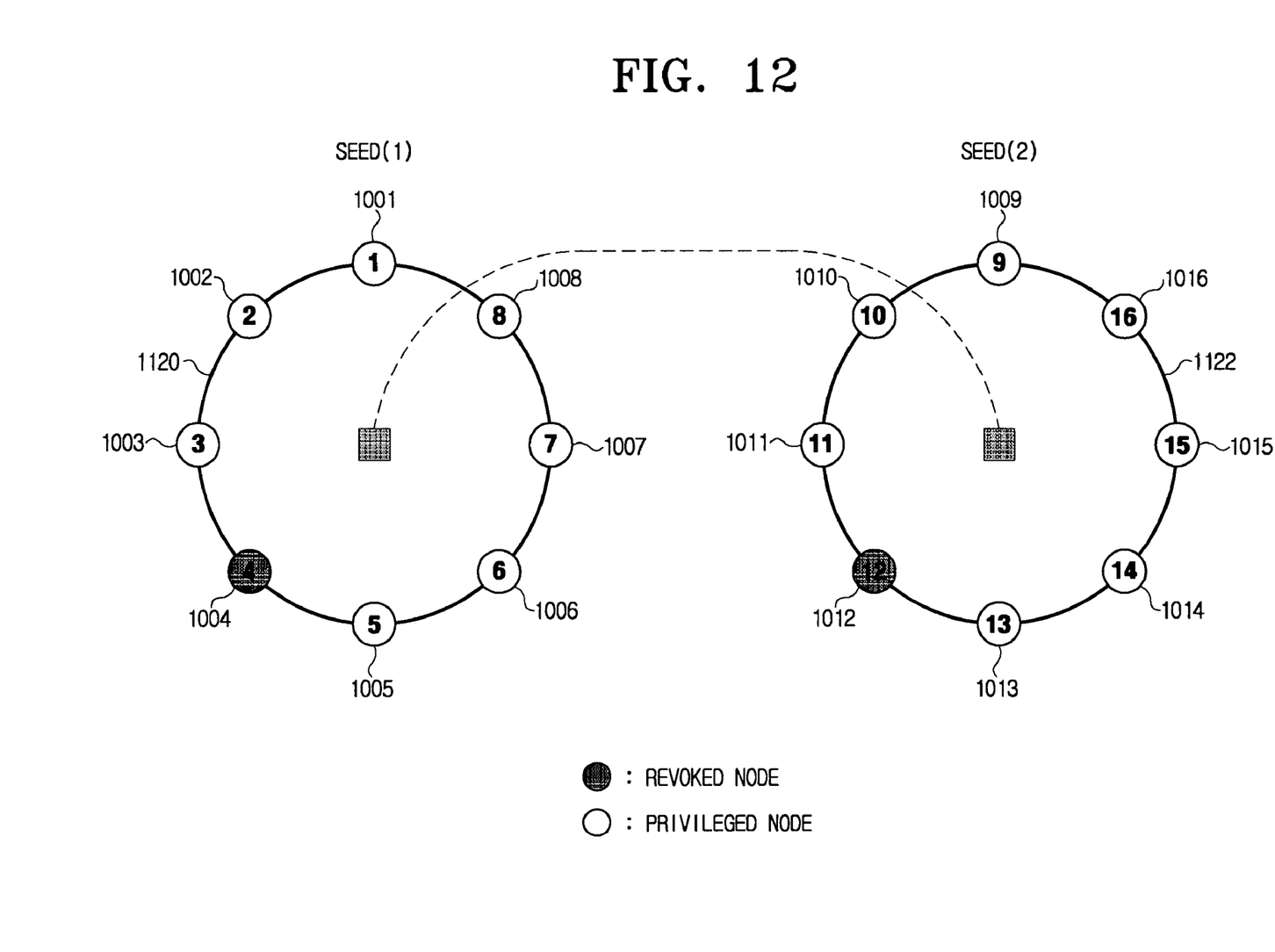
FIG. 12 is another view illustrating the method of transferring session keys to nodes that constitute the two ring-shaped structures according to an illustrative, non-limiting embodiment of the present invention.
Figure 13:
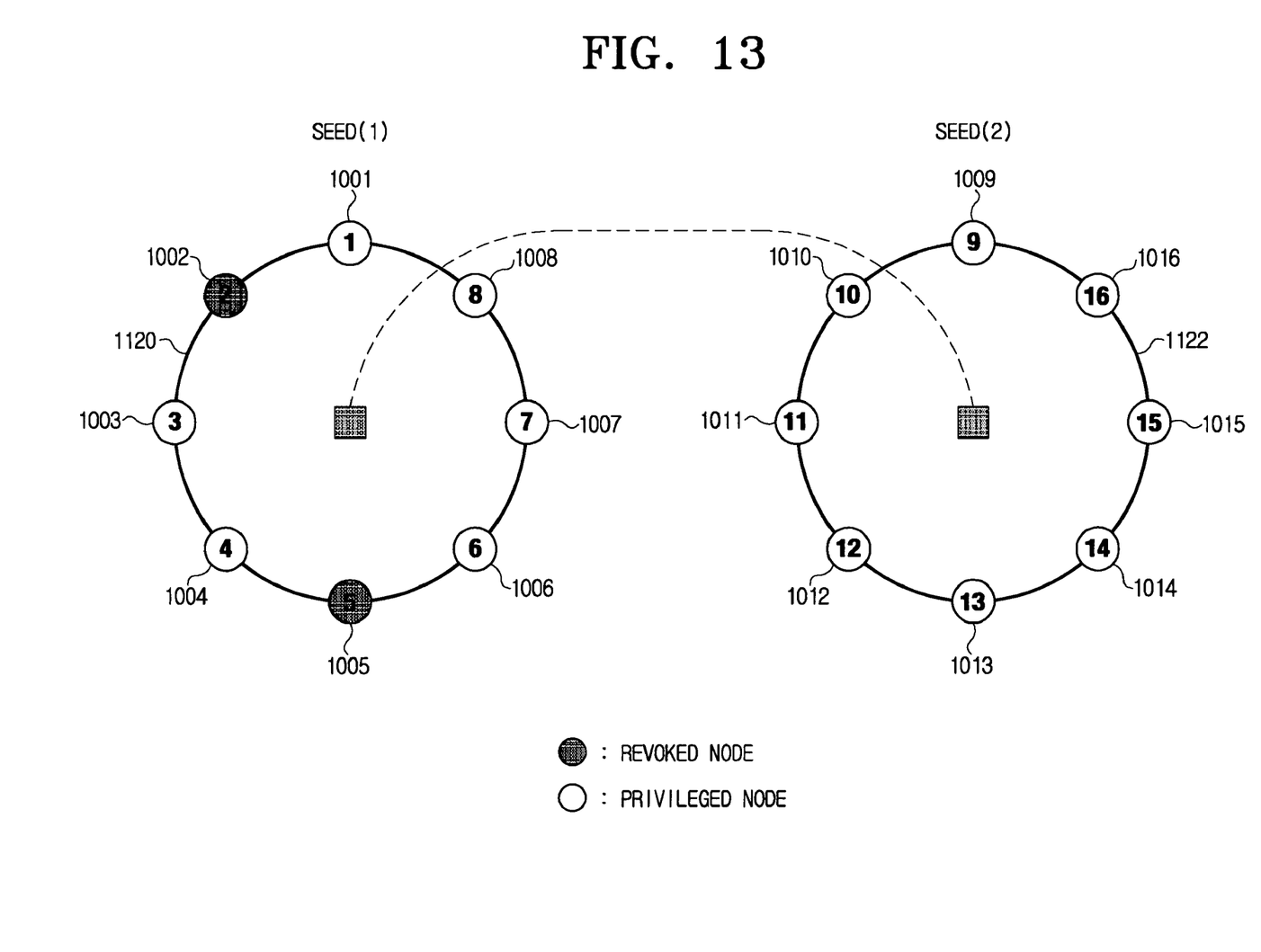
FIG. 13 is another view illustrating the method of transferring session keys to nodes that constitute the two ring-shaped structures according to an illustrative, non-limiting embodiment of the present invention.

Hereinafter, the process of deriving an encryption key for encrypting the service to be transferred to the nodes that constitute the two ring-shaped structures will be explained with reference to FIGS. 11 to 13. Although FIGS. 11 to 13 illustrate the nodes that constitute the two ring-shaped structures, it is apparent that the nodes that constitute at least two ring-shaped structures according to a user's setting.

Figure 11:
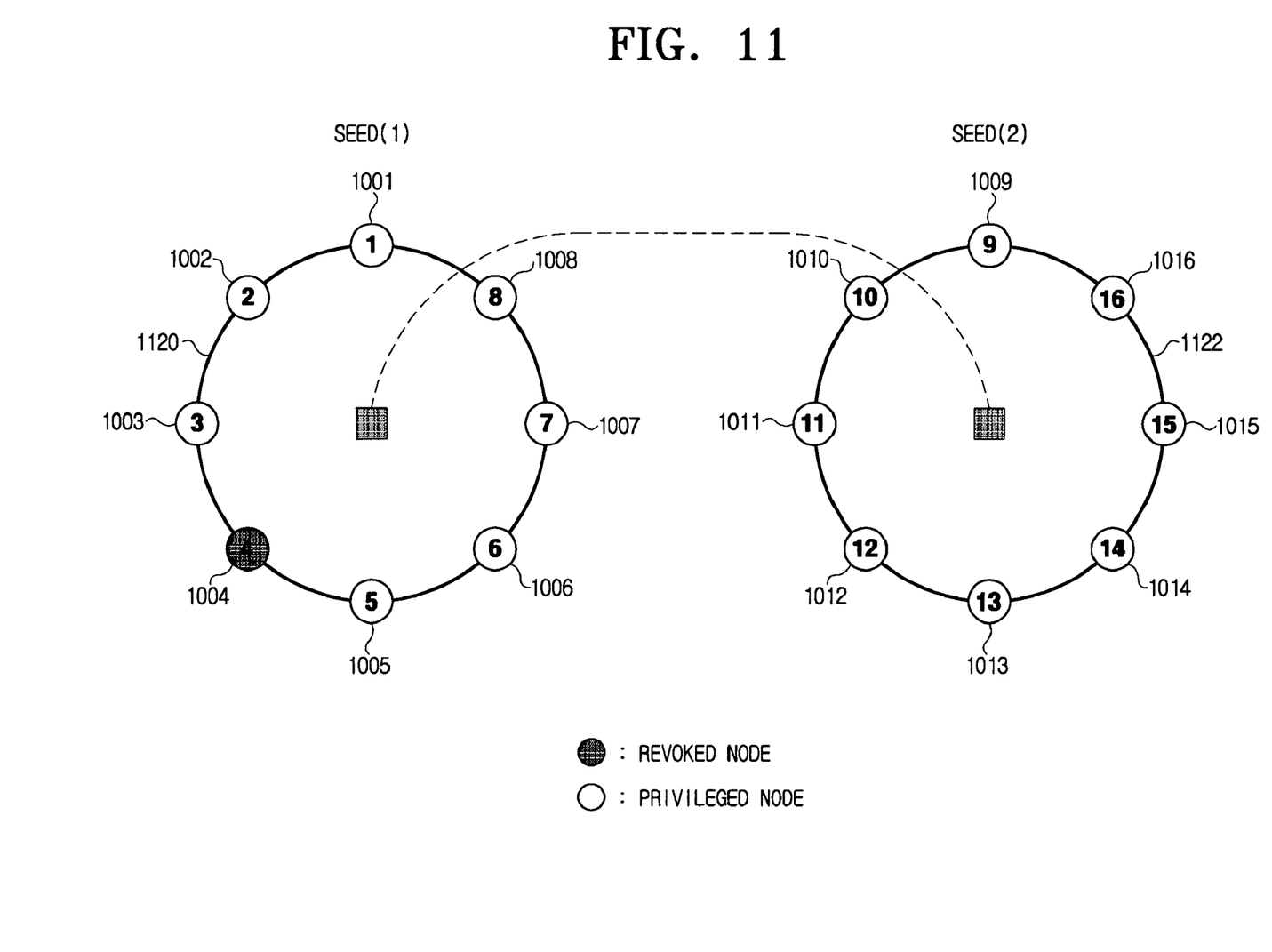
FIG. 11 is a view illustrating a method of transferring session keys to nodes that constitute two ring-shaped structures according to an illustrative, non-limiting embodiment of the present invention.

FIG. 11 illustrates an instance where one node among the nodes that constitute one of the two ring-shaped structures is revoked. Referring to FIG. 11, the revoked node is the fourth node 1004. Referring to FIG. 6, the encryption key for encrypting the service to be transferred to the nodes that constitute the two ring-shaped structures is derived using the keys allocated for the respective ring-shaped structures. However, if the nodes that constitute the ring-shaped structures share the keys, the encryption key is derived using the shared key.

As described above, the general function is also the unidirectional function, and if the fourth node 1004 that constitute the first ring-shaped structure 1120 is revoked, the encryption key is derived using the second seed key allocated to the second ring-shaped structure 1122. That is, the encryption key is derived using the second seed key allocated to the second ring-shaped structure 1122 and fifth to third nodes 1005 to 1003 (counterclockwise).

The encryption key used in FIG. 11 is $H^6G(SEED(2))_5$. The nodes that constitute the second ring-shaped structure 1122 can obtain the encryption key using the second seed key. Additionally, the fifth node 1005 to the third node 1003 of the first ring-shaped structure 1120 can obtain the encryption key using the second seed key and the general function. However, since the hash function is a unidirectional function, the fourth node 1004 cannot obtain the encryption key. That is, if 'G(SEED(2))' is replaced by 'k', the encryption key cannot be obtained in the fourth node 1004, as described above.

FIG. 12 illustrates an instance when the fourth node 1004 of the first ring-shaped structure 1120 and the $12^{th}$ node 1012 of the second ring-shaped structure 1122 are revoked. As illustrated in FIG. 12, if one node among the nodes that constitute the respective ring-shaped structures is revoked, the encryption keys derived for the respective ring-shaped structures, as described above are combined. That is, the service provider generates $H^6k_5$ for the nodes that constitute the first ring-shaped structure 1120, and generates $H^6k_{13}$ for the nodes that constitute the second ring-shaped structure 1122. Accordingly, $\{H^6k_5, H^6k_{13}\}$ obtained by combining $H^6k_5$ and $H^6k_{13}$ is used as the encryption key.

FIG. 13 illustrates the case in which some nodes that constitute one of the two ring-shaped structures are revoked. Referring to FIG. 13, the revoked nodes are the second node 1002 and the fifth node 1005 of the first ring-shaped structure 1120. As explained with reference to FIG. 11, since the nodes that constitute the first ring-shaped structure 1120 are revoked, the encryption key is derived using the second seed key. However, referring to FIG. 13, since two node among the nodes that constitute the first ring-shaped structure 1120 are revoked, the first ring-shaped structure 1120 is divided into two intervals.

Accordingly, the nodes that constitute the first ring-shaped structure 1120 and the nodes that constitute the second ring-shaped structure 1122 can be combined in two ways: 1) a first group being formed of the third node 1003, the fourth node 1004, and the nodes that constitute the second ring-shaped structure 1122, and the second group being formed of the sixth node 1006 to the first node 1001; and 2) the first group being formed of the sixth node 1006 to the first node 1001 and the nodes that constitute the second ring-shaped structure 1122, and the second group being formed of the third node 1003 and the fourth node 1004. Hereinafter, the first exemplary method for deriving the encryption key, according to the exemplary, non-limiting embodiment of the present invention, will be explained.

According to the first method, the service provider provides the encryption key $HG(SEED(2))_3$ for the nodes included in the first group, and provides the encryption key $H^3k_6$ for the nodes included in the second group. Of course, the encryption key used to encrypt the contents is $\{HG(SEED(2))_3, H^3k_6\}$.

As described above, referring to FIG. 13, the nodes that constitute the respective ring-shaped structure share the keys, and thus the length of the encryption key can be reduced.

Additionally, plural ring-shaped structures can be constructed in a diverse form. That is, if the nodes constitute four ring-shaped structures, the nodes that constitute the two ring-shaped structures may share the keys. Also, the node can be constructed in the form of a tree having the ring-shaped structure as illustrated in FIG. 2.

As described above, according to the exemplary, non-limiting embodiments of the present invention, the transmission overhead, which is an important factor of the broadcast encryption, can be reduced. Additionally, even if several users conspire together, they cannot make a new key, and even if an illegal decoder is made, such an illegal use of the key can be traced.

While the exemplary embodiments of the present invention have been particularly shown and described with reference to the accompanying drawings, it will be understood by those of ordinary skill in the art that various changes in form and details may be made therein without departing from the spirit and scope of the present invention as defined by the following claims. It will be understood that the particular method and the structure embodying the invention is shown by way of illustration only and not as a limitation of the invention. The principles and features of this invention may be employed in varied and numerous embodiments without departing from the scope of the invention.

What is claimed is:

1. A method of managing a user key for a broadcast encryption, comprising:

assigning numbers to respective users and arranging the users in a ring-shaped structure, mapping hash chains onto respective nodes of the ring-shaped structure, where each of the nodes corresponds to one of the users;

making random node keys correspond to the respective nodes, one by one;

constructing the hash chains from the corresponding node keys using a hash function, a respective hash chain for a respective node is obtained by hashing key value of the previous node in the ring structure; and successively mapping the constructed hash chains onto the nodes of the ring-shaped structure.

2. The method as claimed in claim 1, flirt her comprising allocating the hash chains of a predetermined length from all the node keys to the respective nodes after the successive mapping.

3. The method as claimed in claim 1, wherein, if a number of nodes of the ring-shaped structure is N, a key to be stored by a node Ui, that is allocated with the node key of $Ki(1 \leq i \leq N)$, is allocated according to:

$Ui=\{Ki, h(K(i+1)), h^2K(i+2), \ldots, h^{(N-2)}K(i-2), h^{(N-1)}K(i-1)\}$, where h is a hash function.

4. The method as claimed in claim 3, wherein, if the node Ui is revoked, a session key is encrypted using $\{h^{(N-2)}K(i+1)\}$.

5. The method as claimed in claim 4, wherein an authorized user, from the users arranged on the ring-shaped structure, calculates a value of $\{h^{(N-2)}K(i+1)\}$ by repeatedly applying h to a value derived from K(i+1) from keys of the authorized users.

6. The method as claimed in claim 3, wherein, if the Ui and an Uj users where ($i<j\leq N$) are revoked, a session key is encrypted using $\{h^{(j-i-1)}K(i+1), h^{(N+i-j-3)}K(j+1)\}$.

7. The method as claimed in claim 1, wherein the users are arranged on at least two ring-shaped structures.

8. The method as claimed in claim 7, wherein the users are provided with seed keys that correspond to the respective ring-shaped structures.

9. The method as claimed in claim 8, wherein a respective ring-shaped structure shares the seed keys of other ring-shaped structures.

10. The method as claimed in claim 9, wherein the respective ring-shaped structure shares the seed keys of other ring-shaped structures using a G function that is a unidirectional function.

11. The method as claimed in claim 10, wherein the nodes form first and second ring-shaped structures, and wherein, if a node that forms the first ring-shaped structure is revoked, a session key is encrypted using the seed key of the second ring-shaped structure.

* * * * *